United States Patent
Uranaka et al.

(10) Patent No.: US 6,550,009 B1
(45) Date of Patent: Apr. 15, 2003

(54) ENCRYPTION SYSTEM FOR DISTRIBUTING A COMMON CRYPT KEY

(75) Inventors: Sachiko Uranaka, Tokyo (JP); Masaki Kiyono, Kamakura (JP); Makoto Tatebayashi, Takarazuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/182,241

(22) Filed: Oct. 30, 1998

(30) Foreign Application Priority Data

Oct. 31, 1997 (JP) .............................. 9-314544
Nov. 13, 1997 (JP) .............................. 9-327170

(51) Int. Cl.[7] .............................................. H04L 9/00
(52) U.S. Cl. ...................................... 713/168; 380/229
(58) Field of Search ................................ 713/186, 185, 713/168, 193; 380/200, 201, 228, 229, 227; 705/51; 360/60, 55

(56) References Cited

U.S. PATENT DOCUMENTS

| | | | |
|---|---|---|---|
| 5,450,489 A | * 9/1995 | Ostrover et al. | 360/60 |
| 5,883,958 A | * 3/1999 | Ishiguro et al. | 705/57 |
| 5,915,018 A | * 6/1999 | Aucsmith | 380/201 |
| 5,991,399 A | * 11/1999 | Graunke et al. | 380/228 |
| 6,081,785 A | * 6/2000 | Oshima et al. | 705/1 |

FOREIGN PATENT DOCUMENTS

EP 0969461 A2 * 5/2000

OTHER PUBLICATIONS

Recording Method to Add Unique Information on POM Disc of DVD BCA (Burst Cutting Area) by M. Oshima et al; National Technical Report vol. 43, No. 3; Jun. 1997; pp., 70–77.

* cited by examiner

*Primary Examiner*—Matthew Smithers
(74) *Attorney, Agent, or Firm*—Lowe Hauptman Gilman & Berner, LLP

(57) ABSTRACT

The present invention provides an encryption system, by which it is possible to safely distribute a common crypt key for decrypting data on an encrypted DVD-ROM by simple devices and procedure. A terminal equipment 1 comprises a DVD-ROM drive, means for sending a key data request to a center device via communication line, and means for decrypting the encrypted common crypt key using a combination of a part of BCA data and a membership number. A center device 2 comprises means for authenticate a user by searching a user data base 23 in response to the key data request, means for obtaining BCA data of the user by searching a BCA data base 21, means for obtaining a common crypt key by searching a key data base 22, and means for encrypting and transmitting the common crypt key using a combination of a part of BCA data and a membership number. Because a combination of a part of BCA data already distributed and the membership number is used as a key for encrypting the common crypt key, it is possible to safely encrypt and transmit the common crypt key by simple devices and procedure.

3 Claims, 3 Drawing Sheets

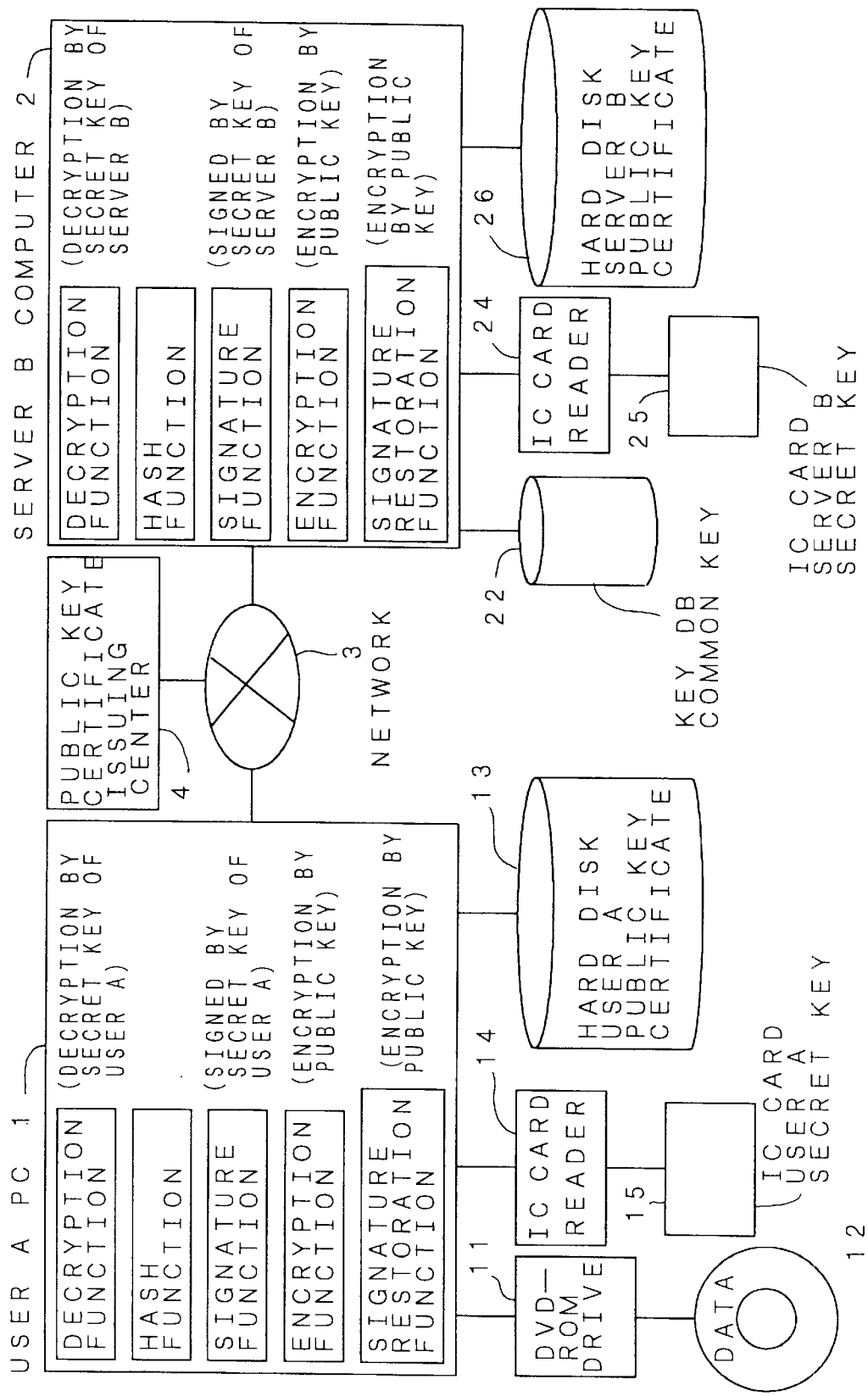

ENCRYPTION SYSTEM FOR DISTRIBUTING A COMMON CRYPT KEY

BACKGROUND OF THE INVENTION

1. Field of the Invention

The present invention relates to an encryption system for decoding encrypted data recorded in a portable storage medium, and in particular to an encryption system for distributing a common crypt key using encryption information in BCA (burst cutting area) of a DVD-ROM.

2. Description of the Prior Art

In order to protect data in CD-ROM or DVD-ROM from being copied illegally, data are generally encrypted. There will be no meaning in the encryption unless a common crypt key for restoring the encrypted data is safely distributed, and it is necessary to have a method to safely distribute a common crypt key. One of the methods for safe distribution of the common crypt key is a method to use a public key encryption. FIG. 3 is a block diagram of a DVD-ROM encryption system designed according to conventional common technique in order to acquire a common crypt key using a public key encryption method.

Description will be given now on the method to acquire a common crypt key by the public key encryption method referring to FIG. 3. Here, it is assumed that a user A receives a common crypt key from a server B on on-line basis. It is also assumed that the data encrypted by the common crypt key is at hand (on DVD-ROM) of the user A and that the user A can specify the index information which can designate a common crypt key required. In acquiring the common crypt key, it is generally necessary to take the following procedure:

(1) A request to acquire a common crypt key is given from the user A to the server B.
- (1-1) An index information to specify a common crypt key of what is to be acquired is obtained.
- (1-2) An information for the request is prepared by random information such as the current time.
- (1-3) A hash value is calculated from the information for request using hash function.
- (1-4) Secret key of the user A is read from an IC card 15.
- (1-4-1) To the IC card 15 storing the secret key, the user A is requested to enter a password.
- (1-4-2) An IC card reader checks whether the password is correct or not and reads the stored secret key.
- (1-5) Using the secret key of the user A, signature is calculated from the hash value.
- (1-6) A public key certificate of the user A is obtained from a storage device (hard disk) of a personal computer.
- (1-7) A public key of the server B is obtained from a certificate issuing center 4.
- (1-8) To the information and the signature for request, RSA encryption is performed using the public key of the server B, and it is sent to the server B together with the public key certificate of the user A.

(2) The server B authenticates the request from the user A.
- (2-1) To the public key certificate of the user A, correctness is confirmed using the public key of the certificate issuing center 4, and the public key of the user A is obtained.
- (2-2) The secret key of the server B is read from an IC card 25. (The same procedure as in (1-4)).
- (2-3) The information and the signature for the request are restored using the secret key of the server B.
- (2-4) Hash value X is calculated from the information for request using hash function.
- (2-5) Hash value Y is restored using the public key of the user A from the signature of the user A.
- (2-6) It is checked whether the hash value X obtained in the step (2-4) is the same as the hash value Y obtained in the step (2-5). If it is the same, it is confirmed that it is a request information from the user A.

(3) The server B delivers a common crypt key to the user A.
- (3-1) The server B specifies a common crypt key necessary from a key DB 22 using request information.
- (3-2) An information for response is prepared by adding random information such as the current time.
- (3-3) Hash value is calculated from the information for response using hash function.
- (3-4) The secret key of the server B is read from the IC card 25. (The same procedure as in (1-4))
- (3-5) Using the secret key of the server B, signature is calculated from the hash value.
- (3-6) A public key certificate of the server B is obtained from a storage device (hard disk) 26 of a personal computer.
- (3-7) To the information and the signature for response, RSA encryption is performed using the public key of the user A, and it is transmitted to the user A together with the public key certificate of the server B.

(4) The user A authenticates the response from the server B, obtains the common crypt key, and restores the data.
- (4-1) To the public key certificate of the server B, correctness is confirmed using the public key at the certificate issuing center 4, and the public key of the server B is obtained.
- (4-2) The secret key of the user A is read from the IC card 15. (The same procedure as in (1-4))
- (4-3) Using the secret key of the user A, the information and the signature for response are restored.
- (4-4) Hash value U is calculated from the information for the response using hash function.
- (4-5) Hash value V is restored using the public key of the server B from the signature of the server B.
- (4-6) It is checked whether the hash value U obtained in the step (4-4) is the same as the hash value V obtained in the step (4-5). If it is the same, it is confirmed that it is response information from the server B.
- (4-7) From the information for response, the common crypt key is separated, and a common crypt key is obtained.
- (4-8) From encryption data in DVD-ROM 12, the data is restored by the common crypt key.

As far as each secret key is protected by the above method, it is almost perfectly possible to defend against wire tapping on communication route or against attacker who pretends to be or disguises as the other user. When the common crypt key has been obtained and if it is stored as it is encrypted by the public key of the user A without directly storing it in hard disk of the personal computer, it is also possible to defend against attack at the time of storage.

In the above procedure, however, it is necessary to check the correctness of the public keys with each other using the public key of the certificate issuing center. Because there is only one secret key respectively, it is necessary to store the key in IC card and the like as described above to ensure safety and to control by password. For this purpose, it is necessary to have a special device (such as IC card reader). This often leads to the problems such as complicated procedure or large-scale design of the system.

Further, safety against attack such as wire tapping of data or disguise or falsification of data depends upon the safety of the control of the secret key of each individual. In this respect, even when the system itself is robust and durable, the safety of the entire system depends upon the managing and controlling ability of each individual. In this sense, the more the users are increased, the bigger the problem may become in actual operation of the system.

To solve the above problems, it is an object of the present invention to safely distribute a common crypt key such as DVD-ROM by simplified devices and procedure.

SUMMARY OF THE INVENTION

To solve the above problems, in the encryption system according to the present invention, an encrypted data decryption device comprises means for sending a data request to a data encryption device, and means for decrypting the data received from the data encryption device using a medium specific information, and the data encryption device comprises means for obtaining the medium specific information corresponding to data request by searching a medium specific information data base, and means for encrypting and transmitting transmission data using the medium specific information. With such an arrangement, it is possible to encrypt and transmit the data using the medium specific information already distributed as a crypt key by simple devices and procedure.

Also, in a terminal equipment such as a DVD-ROM system, there is provided means for decrypting the received data using BCA data, and the center device comprises means for obtaining BCA data of a user by searching BCA data base, and means for encrypting and transmitting the transmission data using BCA data. With such an arrangement, it is possible to encrypt and transmit the data using BCA data of DVD-ROM already distributed as a crypt key by simple devices and procedure.

Further, on the data encryption device (e.g. a center device of DVD-ROM system), there is further provided means for authenticate the user by searching a user data base in response to the data request. With such an arrangement, it is possible to authenticate the user by simple devices and procedure.

Also, in the encrypted data decryption device (e.g. a terminal equipment of DVD-ROM system), there is provided means for sending a key data request to a center device, and the center device comprises means for obtaining a common crypt key by searching a key data base, and means for encrypting and transmitting the common crypt key using BCA data. With such an arrangement, it is possible to encrypt and transmit the common crypt key by simple devices and procedure.

Further, in a center device of DVD-ROM system, for example, there is provided means for encrypting and transmitting a common crypt key using a combination of a part of BCA data and a user identification information (e.g. membership number), and the terminal equipment comprises means for decrypting the received encrypted common crypt key using a combination of a part of BCA data and the membership number. With such an arrangement, it is possible to encrypt and transmit the common crypt key more safely by simple devices and procedure.

Further, on a center device of DVD-ROM system, for example, there are provided means for obtaining a crypt key paired with a decryption key contained in BCA data and means for encrypting transmission data using the crypt key, and the terminal equipment comprises means for decrypting the encrypted transmission data using the decryption key. Further, the above pair of the decryption key and the crypt key is in some cases a public key and a secret key in the public key encryption method respectively. With such an arrangement, it can be designed in such manner that the crypt key is practically impossible to calculate from the decryption key. Thus, it is possible to encrypt and transmit the data safely even by simple devices and procedure and to exclude the attacks such as disguise as the center device or falsification of data.

The encryption system according to the present application comprises a data encryption device for encrypting data and an encrypted data decryption device for decrypting the encrypted data, and the data can be transmitted or received via network or bus between the devices, whereby the encrypted data decryption device comprises means for driving a portable storage medium having medium specific information specific to each medium, means for sending a data request to the data encryption device, and means for decrypting the data received from the data encryption device using the medium specific information, and the data encryption device comprises a data base for storing the medium specific information specific to each portable storage medium, means for obtaining medium specific information corresponding to the data request by searching the data base, and means for encrypting and transmitting the request data using the medium specific information.

By using the medium specific information already distributed as the crypt key, it is possible to obtain an effect to encrypt and transmit the data by simple devices and procedure.

The encryption system according to the present application comprises a center device for encrypting data and a terminal equipment for decrypting the encrypted data, and the data can be transmitted or received via network or bus between the device and equipment, whereby the terminal equipment comprises means for driving a DVD-ROM having BCA data, which is medium specific information specific to each medium, means for sending a data request to the center device, and means for decrypting the data received from the center device using the BCA data, and the center device comprises BCA data base for storing BCA data specific to each DVD-ROM, means for obtaining BCA data corresponding to the data request by searching the data base, and means for encrypting and transmitting the requested data using the BCA data.

By using BCA data already distributed as a crypt key, it is possible to obtain an effect to encrypt and transmit the data by simple devices and procedure.

The encryption system according to the present application comprises a data encryption device for encrypting data, and an encrypted data decryption device for decrypting the encrypted data, and the data can be transmitted or received via network or bus between the devices, whereby the encrypted data decryption device comprises means for driving a portable storage medium having medium specific information specific to each medium, means for sending a data request to the data encryption device and means for decrypting the data received from the data encryption device using the medium specific information, and the data encryption device comprises a medium specific information data base for storing medium specific information specific to each portable storage medium, a user data base for accumulating information relating to users who utilizes the present system, means for authenticate the user of the encrypted data decryption device by searching the user data base in response to the data request, means for obtaining the medium specific information corresponding to the data request by searching the medium specific information data base, and means for encrypting and transmitting the requested data using the medium specific information.

By using BCA data already distributed as the crypt key, it is possible to obtain an effect to authenticate the user and to encrypt and transmit the data by simple devices and procedure.

The encryption system according to the present application comprises a data encryption device for encrypting data, and an encrypted data decryption device for decrypting the encrypted data, and the data can be transmitted or received via network or bus between the devices, whereby the encrypted data decryption device comprises means for driving portable storage medium having medium specific information specific to each medium, means for sending a key data request to the data encryption device, and means for decrypting the key data received from the data encryption device using the medium specific information, and the data encryption device comprises a medium specific information data base for storing medium specific information specific to each portable storage medium, a key data base for storing a common key, means for obtaining a medium specific information corresponding to the key data request by searching the medium specific information data base, means for obtaining a common crypt key corresponding to the key data request by searching the key data base, and means for transmitting the key data, which has been obtained by encrypting the common crypt key using the medium specific information.

By using BCA data already distributed as a crypt key, it is possible to obtain an effect to encrypt and transmit the common crypt key by simple devices and procedure.

The encryption system according to the present application comprises a data encryption device for encrypting data, and an encrypted data decryption device for decrypting the encrypted data, and the data can be transmitted or received via network or bus between the devices, whereby the encrypted data decryption device comprises means for driving portable storage medium having medium specific information specific to each medium, means for sending a key data request to the data encryption device, and means for decrypting the key data received from the data encryption device using a part of the medium specific information, and the data encryption device comprises a medium specific information data base for storing medium specific information specific to each portable storage medium, a key data base for storing a common key, means for obtaining a medium specific information corresponding to the key data request by searching the medium specific information data base, means for obtaining a common crypt key corresponding to the key data request by searching the key data base, and means for transmitting the key data, which has been obtained by encrypting the common crypt key using a part of the medium specific information.

By using a part of BCA data already distributed, it is possible to obtain an effect to encrypt and transmit the common crypt key by simple devices and procedure.

The encryption system according to the present application comprises a data encryption device for encrypting data, and an encrypted data decryption device for decrypting the encrypted data, and the data can be transmitted or received via network or bus between the devices, whereby the encrypted data decryption device comprises means for driving portable storage medium having medium specific information specific to each medium, means for sending a key data request to the data encryption device, and means for decrypting the key data received from the data encryption device using a combination of a part of the medium specific information and a user identification information capable to identify a user who utilizes the present system, and the data encryption device comprises a medium specific information data base for storing medium specific information specific to each portable storage medium, a key data base for storing a common key, means for obtaining medium specific information corresponding to the key data request by searching the medium specific information data base, means for obtaining a common crypt key corresponding to the key data request by searching the key data base, and means for transmitting the key data, which has been obtained by encrypting the common crypt key using a combination of a part of the medium specific information with the user identification information.

By using a combination of a part of BCA data already distributed and the membership number, it is possible to encrypt and transmit the common crypt key by simple devices and procedure.

The encryption system according to the present application comprises a data encryption device for encrypting data, and an encrypted data decryption device for decrypting the encrypted data, and the data can be transmitted or received via network or bus between the devices, whereby the encrypted data decryption device comprises means for driving portable storage medium having medium specific information specific to each medium, means for sending a data request to the data encryption device, and means for decrypting the data received from the data encryption device using a decryption key contained in the medium specific information, and the data encryption device comprises a data base for storing medium specific information specific to each portable storage medium, means for obtaining a crypt key paired with a decryption key in the medium specific information corresponding to the data request by searching the data base, and means for encrypting and transmitting the requested data using the crypt key.

By using keys, which make up a pair and are different from each other with respect to encryption and decryption of transmission data and by using a decryption key contained in BCA data already distributed, it is possible to safely encrypt and transmit the data and to exclude the attacks such as disguise as the center device or falsification of data even by simple devices and procedure.

The encryption system according to claim 8 of the present application is the same as the encryption system according to claim 7, wherein the pair of the decryption key and the crypt key are a public key and a secret key in a public key encryption method.

In encryption and decryption of transmission data, encryption is carried out using the secret key of the public key encryption method, and decryption is carried out by the public key contained in BCA data already distributed. With such an arrangement, it can be designed in such manner that the crypt key is practically impossible to calculate from the decryption key. Thus, it is possible to safely encrypt and transmit the data even by simple devices and procedure and to exclude the attacks such as disguise as the center device or falsification of data.

BRIEF DESCRIPTION OF THE DRAWINGS

The object and features of the present invention will become more readily apparent from the following description taken in conjunction with the accompanying drawings in which:

FIG. 3 is a block diagram of a DVD-ROM system using a public key cryptograph.

DETAILED DESCRIPTION OF THE PREFERRED EMBODIMENT

In the following, detailed description will be given on an embodiment of the present invention referring to the attached drawings. It is needless to say that the present invention is not limited to the embodiment described below, and various changes and modifications can be made without departing from the spirit and the scope of the present invention.

The embodiment of the present invention is an encrypted DVD-ROM system, wherein a request for a common crypt key is sent from a terminal equipment to a center device. The common crypt key by BCA data of a user is obtained at the center device, and the common crypt key is encrypted by a combination of a part of BCA data and a membership number and it is sent back, and the encrypted common crypt key thus received is decoded at the terminal equipment using a combination of a part of BCA data and the membership number.

Figure 1:
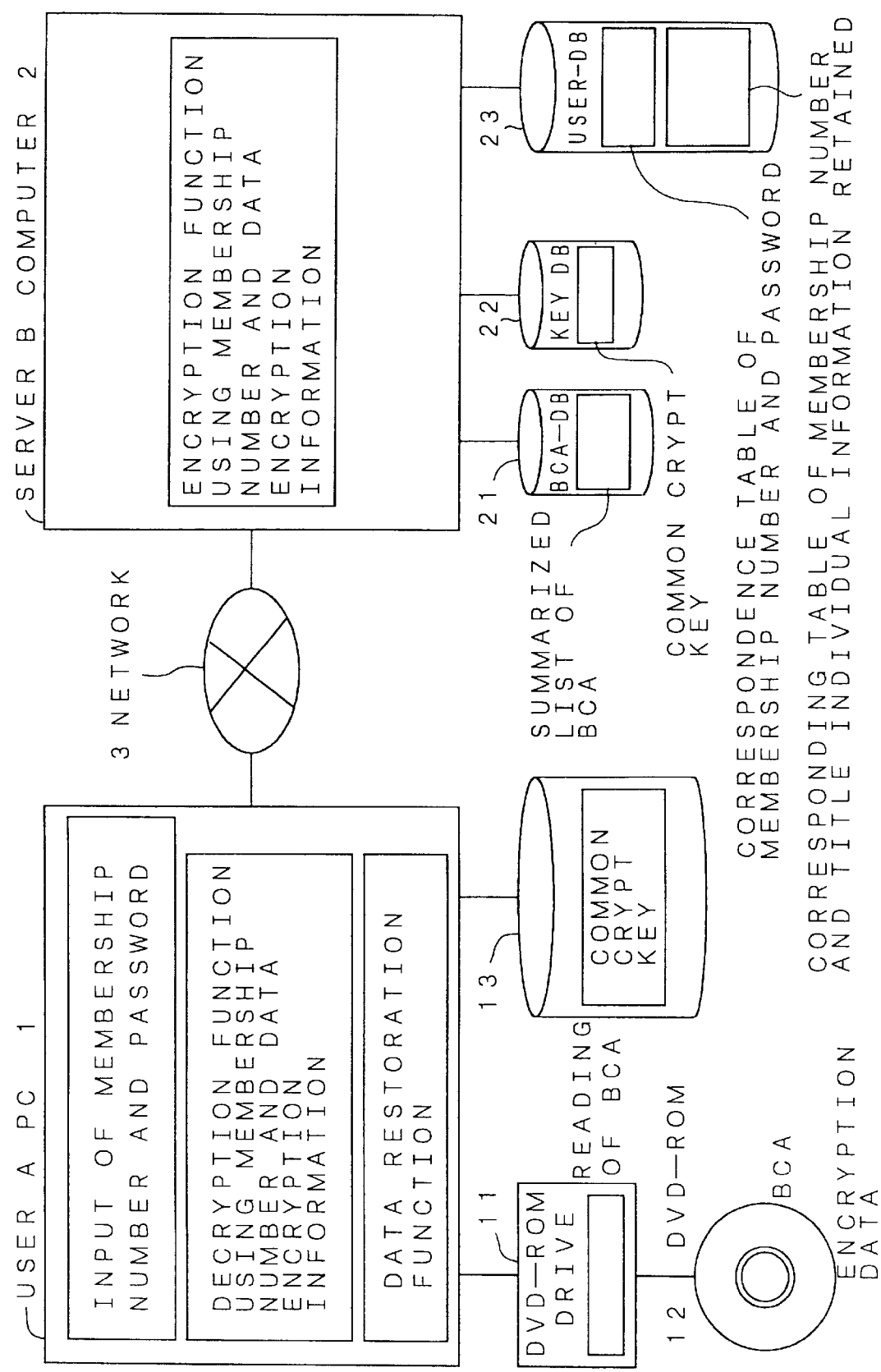
FIG. 1 is a block diagram of an encrypted DVD-ROM system in an embodiment of the present invention.

FIG. 1 shows an arrangement of an encrypted DVD-ROM system in an embodiment of the present invention. In FIG. 1, a terminal equipment 1 is a personal computer of a user A. A DVD-ROM drive 11 is a device to read a DVD-ROM 12. A hard disk device 13 is an external storage device where the received common crypt keys are stored. A center device 2 is a personal computer of a server B. A BCA-DB 21 is a data base where BCA data of all DVD-ROMs are stored. A key data base 22 is a data base where all common crypt keys are stored. A user DB 23 is a data base where a correspondence table of membership numbers (user identification information) and passwords, a correspondence table of membership numbers and information contained in BCA (e.g. title information to be described later), etc. are stored. A network 3 is a telephone line connecting the user A with the server B or a communication line such as Internet.

The information stored at the user DB is not limited to the one described above, and it may be an information which a legal user can legally utilize using the present system. A typical example is a correspondence table of information to specify and identify the user (user identification information) and information relating to the user. Naturally, it may represent the user identification information alone.

Figure 2:
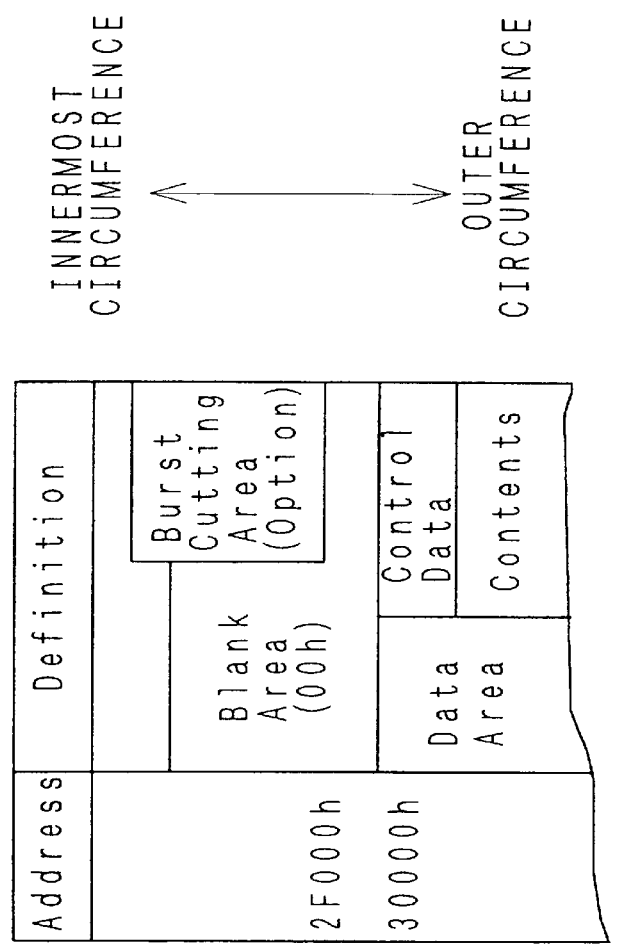
FIG. 2 is a drawing to explain BCA of DVD-ROM.
Figure 2:
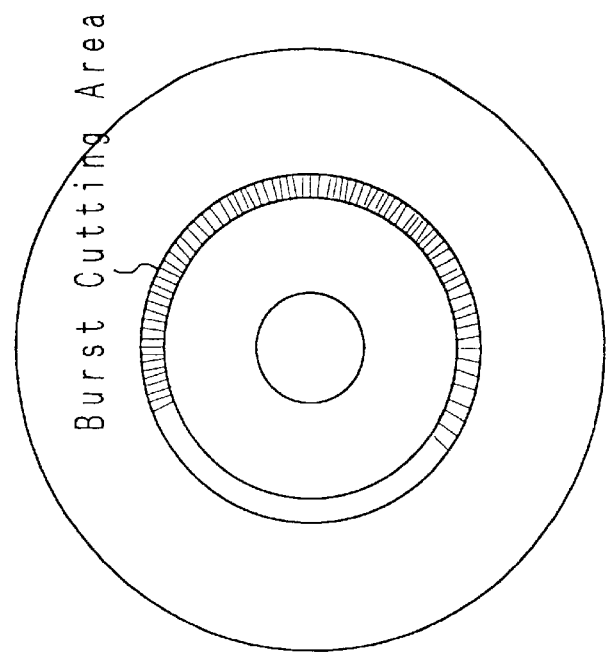

FIG. 2 is a drawing for explaining a BCA (burst cutting area). BCA is a data of 12 to 188 bytes recorded on the innermost track of a DVD-ROM disk. It is recorded individually for each disk and in such a way as to exclude falsification. Unlike the data recorded by DVD pressing, BCA data is written on each of the completed disks by laser irradiation. Regarding BCA, detailed description is given, for example, in "Recording Method to Add Unique Information On ROM Disc of DVD BCA (Burst Cutting Area)" (National Technical Report, Vol.43, No.3, June 1997, pp.290–297).

Now, description will be given on a procedure to acquire a common crypt key in the DVD-ROM system shown in FIG. 1. Here, it is assumed that a user A receives a common crypt key from a server B on on-line basis. Also, it is assumed that the data encrypted by the common crypt key is at hand (in DVD-ROM) of the user A, and that the user A can specify an index information, by which a necessary common crypt key can be designated.

BCA has at least the following types of information:
- (a) Title information: An information to specify an applicable DVD-ROM title.
- (b) Individual identification information: An information to identify each one among the published information with the same title.
- (c) Data encryption information: An information used for encryption of the acquired data (a data to be distributed to the user and a common crypt key in this case).

The procedure to acquire the common crypt key is as follows:

(1) A request is given from the user A to the server B to acquire a common crypt key.
- (1-1) At DVD-ROM drive 11, BCA is read from the DVD-ROM 12, and an index information to specify the common crypt key of what is to be acquired is prepared using the title information in BCA and the individual identification information.
- (1-2) To the user A, it is urged to input membership number and password. Or, membership number and password are read from hard disk.
- (1-3) As an information for request, index information and information on membership number and password are transmitted to the server B.

(2) The authentication of the request from the user A is performed by the server B.
- (2-1) From the information for request from the user A, membership number and password are extracted, and its correctness is confirmed referring to the correspondence table of membership numbers and passwords of the user DB 23.
- (2-2) From the information for request from the user A, membership number, title information, and individual identification information are extracted, and from the correspondence table of the membership number of the user DB 23 and title information and individual identification information, it is confirmed that the user A retains the DVD-ROM.

(3) The server B sends the common crypt key to the user A.
- (3-1) The server B extracts index information from the information for request, and a common crypt key required is identified from the key DB 22.
- (3-2) Using the title information and individual identification information in the index information, data encryption information is picked up from a table of BCA of BCA-DB 21.
- (3-3) Using the data encryption information and the membership number, the common crypt key is encrypted, and this is transmitted to the user A.

(4) The user A obtains the common crypt key from the response of the server B and restores the data.
- (4-1) Data encryption information is extracted from BCA, and using this and membership number, the response of the server B is restored, and the common crypt key is extracted.
- (4-2) From the encryption data in DVD-ROM 12, the data is restored by the common crypt key. However, the common crypt key is stored as it is encrypted by the membership number and the data encryption information in BCA.

The advantage of this system is that it has simple arrangement, and that safety is ensured to some extent. Because the key used for encryption of the data to be transmitted (common crypt key) is already known to both the user A and the server B, there is no need to exchange the keys.

This key (data encryption information in BCA) is different for each of the disks, and it is necessary to have BCA on DVD-ROM for decryption of the transmitted data (common crypt key), and safety can be ensured to some extent. Even in case where the common crypt key is stored at hand, it is possible to avoid copying of the common crypt key if it is kept encrypted using the user ID (membership number) and encryption information on BCA.

Here, the user ID is also used for encryption. This is because, if the data (common crypt key) is encrypted using only the encryption information on BCA (it is supposed that the result of encryption is called key information), the data (common crypt key) may be deciphered by transferring DVD-ROM and key information in set.

In case compensation or counter value to the data (common crypt key) is low, it is possible to prepare an environment usable by a number of users by a simple arrangement as described above. In particular, the cost for encryption is low, and this makes it possible to reduce the burden of cost when it is necessary to distribute the data at a low cost. Also, it is advantageous because safety is relatively high and handling is also easy.

This DVD-ROM system is disadvantageous in that it cannot endure against strong attack such as the case where both the membership number and BCA are leaked out. However, the entire BCA is not sent through the communication route, and to know BCA, it is necessary to acquire its DVD-ROM or to find it from BCA-DB. Thus, it is suitable and durable enough in practical application.

As described above, it is possible according to the present embodiment of the invention to provide a DVD-ROM system, wherein a request for a common crypt key is sent from a terminal equipment to a center device, a common crypt key of a user is obtained using BCA data at the center device, the common crypt key is encrypted using a combination of a part of BCA data and membership number and it is sent back, and the encrypted common crypt key thus received is decoded by a combination of a part of BCA data and membership number at the terminal equipment. Therefore, it is possible to ensure safety to some extent, to encrypt and transmit the common crypt key, and to acquire and store a chargeable data by simple devices and procedure.

The secondary effect to adopt the above arrangement is that, by controlling as to which data has been already sold, it is possible to skip the charging procedure when the data already acquired is to be acquired again. Specifically, no fee is required in case the common crypt key is acquired again in order to decode the data on DVD-ROM by another personal computer and this reduces the influence of replacing the personal computer with another personal computer.

In the steps (3-2) and (3-3) as described above, if a secret key in the public key encryption method and a membership number are used as the information to be used for encryption of the common crypt key and if a public key corresponding to the secret key is recorded as data encryption information of BCA, and if the above public key and the above membership number are used when the response of the server B is restored in the above step (4-1), i.e. if the so-called Message Recovery Signature is applied, it is possible to design in such manner that the encryption of transmission data cannot be performed by any person other than the server B even when it is tried to illegally use the information under the control of the user A. This makes it possible to exclude the disguise as the server B or falsification of the transmission data. This is based on the nature of the public key encryption method, that is, the public key under the control of the user A is different from the secret key corresponding to it and it is practically impossible to calculate the secrete key from the public key.

In the embodiment given above, description has been given on a system, which comprises a terminal equipment and a center terminal connected by a network, while this technique can also be applied to the case of an integrated type system, where the terminal equipment and the center terminal are integrated together as a kiosk terminal and communication is performed via bus, and it is apparent that the same effect can be attained.

In the above embodiment, explanation has been given using DVD-ROM as an example, while the present technique can also be applied on CD-ROM or on the other types of portable storage medium as far as it is a medium where information specific to the medium can be recorded, and it is apparent that the same effect can be attained.

In the present invention, there are provided means for transmitting data request to a data encryption device (e.g. a center device of DVD-ROM system) and means for decoding the received data using medium specific information (e.g. BCA data of DVD-ROM) on an encrypted data decryption device (e.g. terminal equipment of DVD-ROM system), whereby the center device comprises means for obtaining BCA data of the user by searching BCA data base and means for encrypting and transmitting the transmission data by BCA data. This makes it possible to obtain an effect to encrypt and transmit the data by simple devices and procedure using the distributed BCA data as a crypt key.

Also, in the above embodiment it is designed in such manner that there is provided means for searching the user data in response to data request and for authenticating the user on the center device of DVD-ROM system, and this makes it possible to obtain an effect to authenticate the user by simple devices and procedure.

Further, it is designed in such manner that the terminal equipment of DVD-ROM system comprises means for sending a key data request to a center device, and the center device comprises means for obtaining a common crypt key by searching the key data base and means for encrypting and transmitting the common crypt key by BCA data. As a result, it is possible to obtain an effect to encrypt and transmit the common crypt key by simple devices and procedure.

Also, in the present invention, the center device of DVD-ROM system comprises means for encrypting and transmitting the common crypt key by a combination of a part of BCA data and a user identification information (e.g. membership number) capable to uniquely identify the user, and the terminal equipment comprises means for decoding the received encrypted common crypt key by a combination of a part of BCA data and membership number. This makes it possible to obtain an effect to safely encrypt and transmit the common crypt key by simple devices and procedure.

Further, in the present invention, it is designed in such manner that the center device of DVD-ROM system comprises means for obtaining a crypt key paired with a decryption key contained in BCA data and means for encrypting the transmission data by the crypt key, and the terminal equipment comprises means for decrypting the encrypted transmission data using the decryption key. Further, the above pair of the decryption key and the crypt key are in some cases the public key and the secret key in the public key encryption method. By designing in this way, it is now impossible to calculate the crypt key from the decryption key. Thus, even if the devices and the procedure are simple, it is possible to obtain an effect to safely encrypt and transmit the data while excluding the attack such as disguise as the center device or falsification of the data.

While the present invention has been described in connection with the preferred embodiment, various modifications and variations may be made without departing from the scope of the present invention defined by the following claims.

What is claimed is:

1. An encryption system, comprising a data encryption device for encrypting data, and an encrypted data decryption device for decrypting the encrypted data, and data that can be transmitted between or received by either or both of said device(s), said encrypted data decryption device comprising:

means for driving a portable storage medium having medium specific information that is specific to each medium, means for sending a data request to said data encryption device, and means for decrypting data received from said data encryption device using a decryption key contained in said medium specific information;

wherein said data encryption device comprises:

a data base for storing medium specific information that is specific to each portable storage medium, means for obtaining a crypt key, paired with a decryption key in the medium specific information, corresponding to said data request by searching said data base, and means for encrypting and transmitting said requested data using said crypt key;

wherein said pair of decryption key and the crypt key are a public key and a secret key respectively in a public key encryption method.

2. Terminal equipment for receiving encrypted data that encrypted by a secret key, said terminal equipment comprising:

means for receiving data that was encrypted by a secret key;

means for driving a portable storage medium specific information comprising a prerecorded public key adapted to be used as a decryption key;

means for reading out said public decryption key from said storage medium; and means for decrypting said encrypted data using said public key read out from said storage medium.

3. A center device for receiving medium ID that was included in medium specific information that is inherent to each portable storage medium, said center device comprising:

means for searching for a secret key, that makes a pair with a public key included in said medium specific information of said portable storage medium, as a decryption key;

means for generating encrypted data by encrypting data using said secret key; and means for transmitting said encrypted data to a driving apparatus that drives said portable storage medium.

* * * * *